3,037,008
POLYMERIZATION PROCESS

Paul K. Garetson, Tulsa, Okla., and William A. Jones, Baytown, Tex., assignors to Standard Oil Company, Chicago, Ill., a corporation of Indiana
No Drawing. Filed Apr. 6, 1960, Ser. No. 20,247
9 Claims. (Cl. 260—88.2)

This invention relates to an improved process for the preparation of normally solid polymers from charging stocks comprising essentially normally gaseous 1-alkenes in the presence of catalysts comprising essentially supported metal oxides of metals selected from group 5a and/or 6a of the periodic table and certain compounds of aluminum.

In United States patent applications Serial Nos. 493,073, now Patent No. 2,912,419, and 504,684, now U.S. Patent No. 2,824,089, novel processes have been disclosed for the preparation of normally solid polymers of normally gaseous monoolefins by polymerization thereof with heterogeneous catalysts in the presence of aluminum hydrocarbon compounds as co-catalysts. The heterogeneous catalysts of the disclosed processes comprise essentially group 5a and/or group 6a metal oxides supported upon inert solid supporting materials which are preferably difficultly reducible metal oxides such as alumina, magnesia, titania, zirconia, silica, or their composites, etc. The co-catalyst employed together with said supported oxide catalyst comprises essentially an aluminum hydrocarbon compound conforming to the general formula $AlR_3$ wherein the R groups are the same or different monovalent radicals selected from the class consisting of hydrogen and monovalent hydrocarbon radicals. The polymerization or copolymerization process is effected at suitable temperatures within the range of about 20° C. to about 250° C. and pressures suitably between atmospheric and 5000 p.s.i.g. although higher pressures up to 15,000 p.s.i.g. or even higher can be employed.

We have now discovered that the polymerization of normally gaseous 1-alkenes to normally solid polymers by means of supported group 5a and/or 6a metal oxide catalysts and aluminum hydrocarbon compound co-catalysts is remarkably enhanced by effecting the contacting in the presence of minor effective amounts of metallic mercury.

While metallic elements of group 2a of the periodic table, including mercury, have heretofore been employed as components of ethylene polymerization catalysts, such prior art catalyst systems have required the use of an organic peroxide as an essential catalytic ingredient. It is well known that peroxide catalyzed ethylene polymerization leads to a relatively low density, highly branched polyethylene product, having a relatively low melting point and differing substantially in physical properties from the high density, high melting polyethylene obtained by processes such as are described in U.S. Patent No. 2,824,089. It is further well known that the peroxide catalyzed polymerization of 1-olefins such as ethylene proceeds by an entirely different mechanism than in the polymerization by means of solid heterogeneous catalysts (e.g., supported metal oxides), and it was surprising to find that metallic mercury would function as a promoter when effecting polymerization with such solid catalyst systems.

Briefly, the inventive process comprises the conversion of a normally gaseous mono-olefin to high molecular weight normally solid polymers by contact with a catalyst comprising supported oxide of group 5a and/or group 6a of the periodic table, an aluminum hydrocarbon compound co-catalyst conforming to the general formula $AlR_3$ or $AlR_2X$ wherein R is selected from the group consisting of monovalent hydrocarbon radicals and X is a halogen, preferably Cl or Br, and a promoter comprising essentially metallic mercury. The polymerization or copolymerization process is effected at suitable temperatures in the range of about 20° to about 250° C. and atmospheric to any desired maximum pressure, for example 15,000; 30,000 p.s.i.g. or even higher pressures, suitably pressures between about 200 and about 5000 p.s.i.g. or about 500 to 1000 p.s.i.g.

In the polymerization of normally gaseous 1-alkenes, the proportion of transition metal oxide catalyst (including the catalyst support), with respect to the olefin charging stock, may vary from about 0.001 to about 20 weight percent, being not usually a critical feature of our process. The proportion of hydrocarbon aluminum compound, based on the olefinic charging stock, can be varied within the range of about 0.001 to about 20 weight percent, the precise proportion selected for use being dependent upon the desired rate of polymerization, the concentration of contaminants in the olefinic feedstock which tends to react with or destroy the hydrocarbon aluminum compound, the particular olefin-containing charge stock, temperature and other reaction variables. Generally, the amount of mercury employed in our catalyst system can range from about 0.01 to about 20 weight percent, preferably from about 0.1 to about 10 percent based on the solid catalyst employed, but can be as high as 5 or even 10 times the weight of solid catalyst without harmful effect.

It is desirable to supply to the reaction zone a liquid medium which serves both as a transport medium for solid products and as a solvent for the olefin feedstock and organo-metallic co-catalyst. Suitable liquid reaction media for polymerization include various hydrocarbons, e.g., liquid paraffins such as n-heptane or octane or aromatic hydrocarbons such as benzene, toluene or xylenes. The polymerization can be effected in the absence of a liquid reaction medium or solvent and solid catalyst containing accumulated solid polymers can be treated from time to time, within or outside the conversion zone, to effect removal of polymers therefrom and, if necessary, reactivation or regeneration of the catalyst for further use.

Ethylene, propylene, and butene-1 are particularly preferred feedstocks. The olefinic charging stocks may contain inert hydrocarbons, as in refinery gas streams; for example, methane, ethane, propane, etc. The process of the present invention is especially effective in copolymerization of terminal vinyl olefins having from 2 to 4 carbon atoms with each other or with other polymerizable materials, e.g., t-butylene, conjugated diolefinic hydrocarbons such as butadiene, isoprene, and the like; styrene, ar-alkyl styrenes; various vinyl compounds such as tetrafluoro ethylene, perfluorovinyl chloride and the like. When comonomers are employed with the principal charging stock, their proportion may range between about 1 and about 75% by weight, based on the weight of the principal olefin charging stock, such as ethylene or butene-1.

The oxide catalyst ingredients employed in the present invention are those of metals of group 5a or group 6a (transition series members) of the periodic table, viz. V, Nb, Ta, Cr, Mo, W or mixtures thereof. The metal oxides are preferably extended upon suitable supports. The supported group 5a or 6a oxides are calcined in air at temperatures between about 250° and about 700° C. before use to minimize the concentration of water or hydroxy groups in the catalysts and/or supports. Probably even the chemical structures as well as the physical characteristics of the catalysts are affected by the high temperature calcination.

The group 5a or 6a oxides can be at least partially pre-reduced before use and preferably before contact with the hydrocarbon aluminum co-catalyst by the use of various reducing agents such as hydrogen, saturated hydrocarbons, CO, $H_2S$ or their equivalents.

The group 5a or 6a metal oxide can be extended upon suitable supports (having surface areas, for example, between about 1 and about 1500 square meters per gram), for example, difficulty reducible metal oxides such as alumina, magnesia, titania, zirconia, silica or their composites, e.g., synthetic aluminosilicates, clays and the like. The relative proportion of support to the catalytic metal oxide is not critical and may be varied throughout a relatively wide range such that each component is present in amounts of at least approximately one weight percent. The usual metal oxide to support ratios are in the range of about 1:20 to 1:1, or approximately 1:10. We may employ metal oxide catalysts composed of a supporting material containing about 1 to 80% preferably about 5 to 35%, or approximately 10% of chromia, molybdena or tungstia or mixtures of these metal oxides supported thereon.

The transition metal oxide can be incorporated in the catalyst support in any known manner, for example, by mechanical means as by ball milling, by impregnation, coprecipitation, cogelling and/or absorption techniques which are well known in the catalyst art. It may be desired to confine the metal oxide almost completely to a surface film on the support, rather than to achieve deep impregnation of the support with metal oxide catalyst, in order to minimize mechanical disintegration of the catalyst by solid polymer.

In order to reduce the requirements of the hydrocarbon aluminum co-catalyst, it is sometimes advantageous to effect partial reduction of catalysts comprising group 5a metal pentoxides or hexavalent group 6a metal oxides before use in the polymerization process. The partial reduction and conditioning treatment of the solid metal oxide catalyst is preferably effected with hydrogen although other reducing agents such as carbon monoxide, mixtures of hydrogen and carbon monoxide (water gas, synthesis gas, etc.), sulfur dioxide, hydrogen sulfide, dehydrogenatable hydrocarbons, etc. may be employed. Hydrogen can be employed as a reducing agent at temperatures between about 350° C. and about 850° C., although it is more often employed at temperatures within the range of 450° C. to 650° C. The hydrogen partial pressure in the reduction or conditioning operation can be varied from sub-atmospheric pressures, for example, even 0.1 pound (absolute), to relatively high pressures up to 3000 p.s.i.g., or even more. The simplest reducing operation can be effected with hydrogen at about atmospheric pressure.

The proportion of group 5a or 6a metal oxide catalyst (including support), based on the weight of the monoolefinic charging stock can range upwardly from about 0.001 weight percent to 20 weight percent or even more. In a polymerization operation carried out with a fixed bed of catalyst, the catalyst concentration relative to olefin can be very much higher. The efficiency of the supported metal oxide catalysts is extremely high in the presence of hydrocarbon aluminum co-catalysts, so that said metal oxide catalysts can be employed in very small proportions, based on the weight of charging stock, for example, between about 0.001 and about 10 weight percent, while maintaining high conversion efficiency.

The hydrocarbon aluminum compounds which can be used in practicing the present invention have the general formula $AlR_3$ or $AlR_2X$ in which the R groups are the same or different monovalent hydrocarbon radicals, preferably lower alkyl groups such as methyl, ethyl, propyl, butyl or higher, e.g. up to 8 to 10 carbon atoms and X is a halogen, preferably Cl or Br. Examples of other suitable R groups include aryl radicals, aliphatic hydrocarbon radicals or derivatives thereof, such as cyclo- alkylalkyl, cycloalkenylalkyl, aryl-alkyl, cycloalkyl, alkylcycloalkyl, aryl-cycloalkyl, alkaryl, or cycloalkyl-aryl radicals. Specific and non-limitative examples of R groups for substitution in the above formula are set out in U.S. Patent No. 2,824,089.

The proportion of hydrocarbon aluminum co-catalyst, based on the weight of the olefinic charging stock, can range from about 0.001 to 20 weight percent or even more, although it is usually employed in proportions between about 0.001 and about 10 weight percent, e.g., usually about 0.01 to about 5 weight percent.

The proportion of metallic mercury, based on the weight of olefinic charging stock, can range broadly from about .001 to 20 weight percent, although it is preferably employed in an amount between about 0.001 and about 5 percent, advantageously about 0.01 to about 2 weight percent. The amount of mercury employed is generally in the range of about 0.1% to about 10% by weight based on the weight of metal oxide catalyst (including support).

The mercury promoter can be added to the reaction medium together with the catalyst components, and the olefin or mixture of olefins added thereto at reaction temperature, or alternatively, the mercury promoter can be added just prior to contacting the heated catalyst-cocatalyst reaction medium (in the form of a stirred slurry) with the olefin reactants.

The olefinic charging stock is polymerized in the presence of a substantially inert liquid reaction medium which functions as a partial solvent for the monomer, which may function as a solvent or partial solvent for the organo-metallic co-catalyst and which also functions as a liquid transport medium to remove normally solid polymerization products as a dispersion in said medium from the polymerization reactor, thus permitting efficient and continuous polymerization operations. Suitable liquid reaction media are various classes of hydrocarbons or their mixtures which are liquid and substantially inert under the polymerization conditions of the present process, for example various saturated hydrocarbons (alkanes and cycloalkanes) which are liquid under the polymerization reaction conditions, aromatic hydrocarbons, particularly the mononuclear aromatic hydrocarbons, tetrahydronaphthalene, alkyl naphthalenes and the like. Either pure alkanes, cycloalkanes and aromatic hydrocarbons may be employed, or commercially available mixtures thereof, freed of catalyst poisons, e.g. alkane mixtures such as mineral spirits which have been treated with sulfuric acid to remove unsaturated hydrocarbons, aromatic hydrocarbon fractions obtained by the selective extraction of aromatic naphthas, from hydroforming operations as distillates or bottoms, from cycle stock fractions of cracking operations, etc.

The liquid hydrocarbon reaction medium should be freed of poisons before use in the present invention by acid treatment, e.g. with anhydrous p-toluene sulfonic acid, sulfuric acid, or by equivalent treatments, for example with aluminum halides, or other Friedel-Crafts catalysts, maleic anhydride, calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of such treatments.

It is desirable to minimize or avoid the introduction of water, oxygen, carbon dioxide, acetylene or sulfur compounds into contact with the catalyst or co-catalyst. Any known means may be employed to purify the olefinic charging stocks of these materials prior to their introduction into the polymerization reactor.

The following specific examples are introduced as illustrations of our invention and should not be interpreted as an undue limitation thereof. The ethylene employed in the polymerization reactions was a commercial product containing less than 50 p.p.m. oxygen. Prior to use in polymerization the solid metal oxide catalysts were calcined in air at temperatures within the range of about 430° C. to 570° C. at atmospheric pressure.

*Example 1*

A 250 cc. capacity stainless steel autoclave equipped with a magnetically activated stirrer was thoroughly dried and charged with 100 ml. of purified mineral spirits (boiling range—335° to 375° F.), 3.0 g. of a solid catalyst consisting of 9.8% chromium oxide supported on silica which had been calcined 17 hours at 500° C. and 0.6 g. triisobutyl aluminum. The reactor contents were then heated with stirring to 125° C. and 0.1 g. metallic mercury charged to the reactor. A mixture of ethylene and 1-butene (in a molar ratio of 3 mols 1-butene per mol ethylene) was then charged to the reactor at a reactor pressure of 1200 p.s.i.g., and the reactor pressure and temperature maintained at this level while heating and stirring for three hours. At the end of the run, the reactor was cooled and the contents treated with methanolic hydrochloric acid. The solids were separated by filtration, dried and extracted with n-heptane. The heptane extract containing dissolved polymer was added to methanol, the precipitated polymer filtered off and dried. A yield of 24 g. of solid polymer having an intrinsic viscosity of 0.9 dl./g. (measured in xylene at 130° C.) was obtained. Infrared analysis showed that the product was an ethylene-1-butene copolymer containing 4.2 mol percent 1-butene in the polymer molecule.

A control run under the same conditions except that no mercury was charged yielded only 3 g. of polymer having an intrinsic viscosity of 1.6 dl./g. and a 1-butene content (by infrared) of 4.6 mol percent.

When the above experiment was repeated using 0.2 g. of metallic mercury in the absence of any added aluminum triisobutyl, only a trace of solid polymer (less than 0.2 g.) was obtained under similar conditions of pressure and temperature, indicating that mercury does not function as a promoter with a supported metal oxide catalyst in the absence of a hydrocarbon aluminum co-catalyst.

*Example 2*

Following the procedure of Example 1, a one liter autoclave with magnetically actuated stirrer was charged with 0.5 g. of a solid catalyst consisting of 7 weight percent $V_2O_5$ on 60–200 mesh silica which had been calcined in air at 550° C. for 17 hours, 1.7 g. of methyl aluminum sesquibromide (as a 1 M. solution in n-heptane) and 5.0 g. metallic mercury. The reactor was closed, purged with hydrogen gas and charged at 20° C. with 350 g. of a 1:1 molar mixture of ethylene and 1-butene. The reactor temperature was maintained at 20° C. for four hours. During this period, the reactor pressure fell from 410 p.s.i.g. to 285 p.s.i.g. The reaction mixture was treated with acetone containing hydrochloric acid, filtered and dried. The recovered polymer weighed 42.5 g. and had an intrinsic viscosity of 1.3 dl./g. and 8.7 mol percent 1-butene content by infrared analysis.

In an analogous run, in the absence of mercury promoter, a yield of 36.5 g. of solid polymer was obtained, having an intrinsic viscosity of 2.1 dl./g. and 7.8 mol percent 1-butene content by infrared analysis.

Although the novel polymerization processes of the present invention have been generally described and specifically illustrated above, it will be apparent that the invention is capable of very substantial extension therefrom. Thus, the normally gaseous mono-olefinic hydrocarbons employed as feedstocks can be homopolymerized or copolymerized in admixture with each other, or in admixture with various other polymerizable monomeric substances. Vinyl alkene monomers having the generic formula $RCH=CH_2$ wherein R is an alkyl radical having 3 or more carbon atoms are particularly suitable as comonomers for polymerization with the gaseous monoolefins. Specifically suitable vinyl alkenes for this purpose include 1-pentene, 3-methyl-1-butene, 1-hexene, t-butyl-ethylene, and the like.

Vinyl arenes are suitable feedstocks for use as comonomers with normally gaseous monoolefinic hydrocarbons, especially with ethylene. Examples of vinyl arenes are styrenes, nuclearly alkylated (especialy methylated) styrenes, halogenated styrenes and the like.

The polymers produced by the process of the present invention can be subjected to such after treatment as may be desired to fit them for particular uses or to impart desired properties. Thus, the polymers can be extruded, milled, filmed or cast, or converted to sponges or latices; compounded with various antioxidants, fillers, stabilizers and the like; blended with other compatible high molecular weight polymers or with lower molecular weight polyethylene, atactic polypropylene, polybutenes, etc. to impart stiffness or flexibility or other desired properties. They can be subjected to chemical modifying treatments, e.g. halogenation, sulfohalogenation, sulfonation and the like, or to physical treatments such as heat treatment, irradiation with radioactive substances or high energy X-rays, etc. to produce materials having properties which make them useful in various commercial applications. The polymers of the present invention can be otherwise used or treated as the polymers whose preparation is described in United States Patent 2,691,647 of Edmund Field and Morris Feller, granted October 12, 1954.

Having thus described our invention, what we claim is:

1. A polymerization process for the production of a normally solid resin which comprises subjecting a solution of a normally gaseous monoolefinic hydrocarbon having 2 to 4 carbon atoms in a substantially inert hydrocarbon reaction medium under polymerization conditions including a temperature between about 20° C. and about 250° C. to the action of a catalyst comprising a minor proportion of an oxide of a metal selected from the class consisting of groups 5a and 6a of the periodic table extended upon a major proportion of a solid inert supporting material and a hydrocarbon aluminum compound co-catalyst containing at least two monovalent hydrocarbon radicals in the presence of a minor effective amount of metallic mercury and recovering a normally solid resin thus produced.

2. The process of claim 1 wherein said metal oxide is chromium oxide.

3. The process of claim 1 wherein said inert supporting material is a difficultly reducible metal oxide.

4. The process of claim 1 wherein said hydrocarbon aluminum compound is a member of the group consisting of compounds having the formula $AlR_3$ and $AlR_2X$ wherein R is an alkyl group having from 1 to 4 carbon atoms and X is a halogen.

5. In a polymerization process for the production of a normally solid resin, the steps of contacting a charging stock comprising at least one normally gaseous monoolefinic hydrocarbon having 2 to 4 carbon atoms dissolved in an inert hydrocarbon reaction medium with a solid catalyst comprising a minor proportion of an oxide of chromium supported on a major proportion of a difficultly reducible metal oxide and a co-catalyst having the formula $AlR_3$ wherein R is a monovalent hydrocarbon radical, each catalyst component being present in an operative proportion of at least 0.001% by weight, based on the weight of said monoolefinic hydrocarbon, in the presence of metallic mercury in an amount between about 0.1 to about 10% based on the weight of said solid catalyst effecting said contacting at superatmospheric pressure at a suitable polymerization temperature between 20° C. and 250° C., and recovering said resin so produced.

6. The process of claim 5 wherein said gaseous monoolefinic hydrocarbon is ethylene.

7. The process of claim 5 wherein said monoolefinic hydrocarbon is propylene.

8. The process of claim 5 wherein said charging stock comprises a mixture of at least two monoolefinic hydrocarbons having 2 to 4 carbon atoms in the molecule.

9. The process of claim 5 wherein said charging stock comprises a mixture of ethylene and butene-1.

References Cited in the file of this patent

UNITED STATES PATENTS

| | | |
|---|---|---|
| 2,824,089 | Peters et al. | Feb. 18, 1958 |
| 2,886,561 | Reynolds et al. | May 12, 1959 |

FOREIGN PATENTS

| | | |
|---|---|---|
| 1,137,020 | France | Jan. 7, 1957 |